(12) United States Patent
Lee et al.

(10) Patent No.: US 12,427,739 B2
(45) Date of Patent: *Sep. 30, 2025

(54) RUBBER REINFORCING MATERIAL WITH REDUCED WEIGHT, METHOD OF PREPARING THE SAME AND TIRE COMPRISING THE SAME

(71) Applicant: KOLON INDUSTRIES, INC., Seoul (KR)

(72) Inventors: Sang Woo Lee, Seoul (KR); Ok Hwa Jeon, Seoul (KR); Min Ho Lee, Seoul (KR); Sung Gyu Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 101 days.

This patent is subject to a terminal disclaimer.

(21) Appl. No.: 17/998,683

(22) PCT Filed: Oct. 1, 2021

(86) PCT No.: PCT/KR2021/013510
§ 371 (c)(1),
(2) Date: Nov. 14, 2022

(87) PCT Pub. No.: WO2022/114497
PCT Pub. Date: Jun. 2, 2022

(65) Prior Publication Data
US 2023/0173777 A1  Jun. 8, 2023

(30) Foreign Application Priority Data

Nov. 30, 2020 (KR) .......................... 10-2020-0164511
Sep. 30, 2021 (KR) .......................... 10-2021-0129848

(51) Int. Cl.
*B29D 30/38* (2006.01)
*B60C 9/12* (2006.01)

(52) U.S. Cl.
CPC ................ *B29D 30/38* (2013.01); *B60C 9/12* (2013.01); *B29D 2030/383* (2013.01)

(58) Field of Classification Search
None
See application file for complete search history.

(56) References Cited

U.S. PATENT DOCUMENTS

| 2010/0112365 A1 | 5/2010 | Obrecht |
| 2018/0147888 A1 | 5/2018 | Miller |

(Continued)

FOREIGN PATENT DOCUMENTS

| CN | 101484311 A | 7/2009 |
| CN | 110809517 A | 2/2020 |

(Continued)

OTHER PUBLICATIONS

European Search Opinion for corresponding application No. 21 898 324.5, Jul. 12, 2024.*

(Continued)

*Primary Examiner* — Arti Singh-Pandey
(74) *Attorney, Agent, or Firm* — Harvest IP Law, LLP

(57) ABSTRACT

This invention relates to rubber reinforcing material with reduced weight, a method for preparing the same, and a tire including the same. According to this invention, there is provided a rubber reinforcing material that has a thin thickness and a light weight, and yet has excellent durability. The reinforcing material not only reduces the weight of a tire, but also enables realization of improved rolling resistance.

8 Claims, 2 Drawing Sheets

(56) References Cited

U.S. PATENT DOCUMENTS

| | | | |
|---|---|---|---|
| 2020/0122508 A1* | 4/2020 | Kim | B60C 9/0042 |
| 2021/0154975 A1* | 5/2021 | Yim | C09J 119/02 |
| 2022/0372672 A1* | 11/2022 | Lee | D06M 15/693 |
| 2023/0278319 A1* | 9/2023 | Lee | B60C 9/20 |
| | | | 152/548 |

FOREIGN PATENT DOCUMENTS

| | | | |
|---|---|---|---|
| EP | 0 677 546 A1 * | 10/1995 | |
| JP | 2001-510757 A | 8/2001 | |
| JP | 2002155169 A | 5/2002 | |
| JP | 2002201314 A | 7/2002 | |
| JP | 2004-308027 A | 11/2004 | |
| JP | 2004-323662 A | 11/2004 | |
| JP | 2005-537349 A | 12/2005 | |
| JP | 2007-145292 A | 6/2007 | |
| JP | 2009-541098 A | 11/2009 | |
| JP | 2011156785 A | 8/2011 | |
| JP | 2013-052742 A | 3/2013 | |
| JP | 2014-218096 A | 11/2014 | |
| JP | 2016-515661 A | 5/2016 | |
| JP | 2017538871 A | 12/2017 | |
| JP | 2018500218 A | 1/2018 | |
| JP | 2019-001979 A | 1/2019 | |
| JP | 2020-525344 A | 8/2020 | |
| KR | 2019-0143690 A | 12/2019 | |
| KR | 20200036347 A | 4/2020 | |
| WO | 2017-208852 A1 | 12/2017 | |
| WO | 2019-245337 A1 | 12/2019 | |

OTHER PUBLICATIONS

International Search Report Dated Jan. 27, 2022.
The Office Action dated Jun. 10, 2025, of the corresponding Chinese Patent Application.

* cited by examiner

【Figure 1】
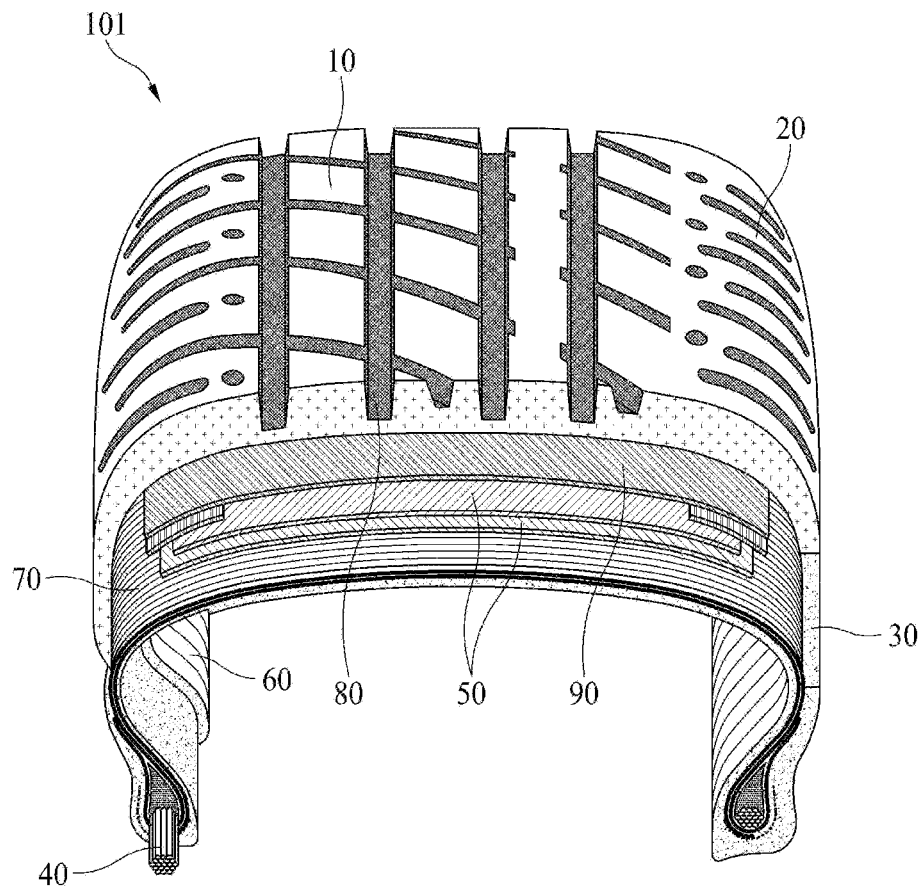
【Figure 2】
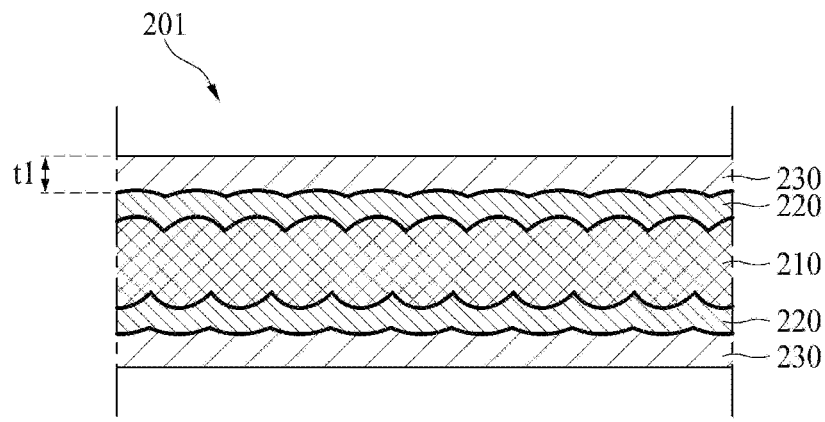

【Figure 3】
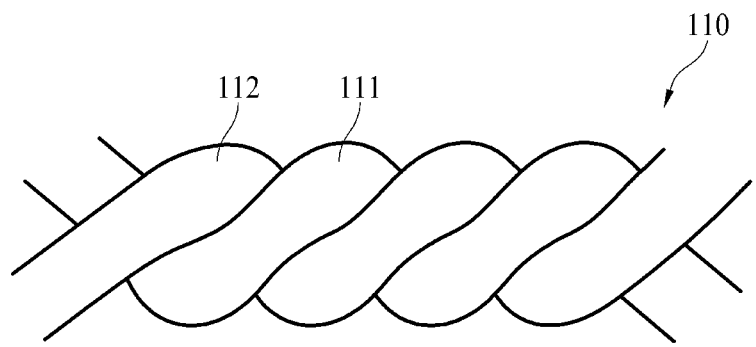
【Figure 4】
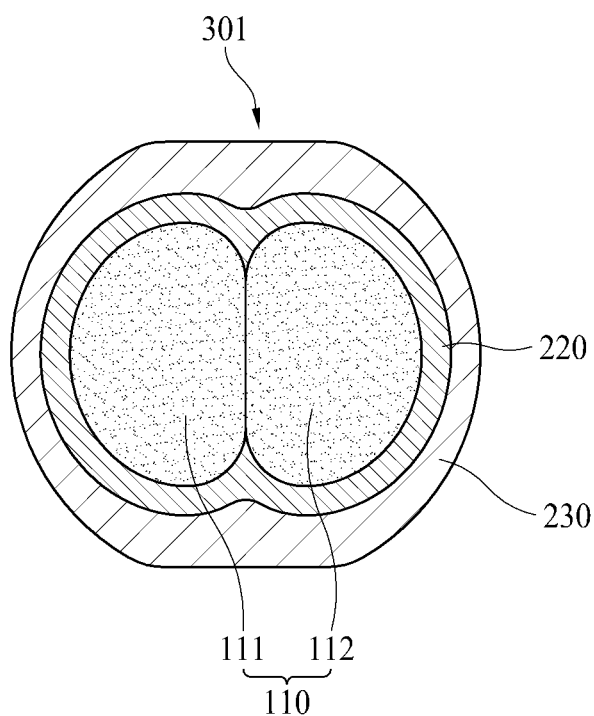

RUBBER REINFORCING MATERIAL WITH REDUCED WEIGHT, METHOD OF PREPARING THE SAME AND TIRE COMPRISING THE SAME

CROSS-REFERENCE TO RELATED APPLICATIONS

This application is a National Stage of International Application No. PCT/KR2021/013510 filed Oct. 1, 2021, claiming priority based on Korean Patent Application No. 10-2020-0164511 filed on September Nov. 30, 2020 and Korean Patent Application No. 10-2021-0129848 filed on Sep. 20, 2021.

TECHNICAL FIELD

This invention relates to a rubber reinforcing material with reduced weight that is capable of reducing the weight of a tire, a method for preparing the same, and a tire including such rubber reinforcing material.

BACKGROUND OF ART

With the increase in the performance of automobiles and improvements in road conditions, a tire is required to maintain stability and durability during high speed running of an automobile. And, considering environmental problems, energy problems, fuel efficiency, and the like, a tire that has reduced weight, and yet has excellent durability is required. As one of the solutions for satisfying such requirement, studies on a tire cord used as a rubber reinforcing material of a tire are actively progressing.

Tire cord may be divided according to the part used and function. For example, the tire cord may be largely divided into a carcass generally supporting a tire, a belt withstanding a load and preventing deformation according to high speed running, and a cap ply preventing deformation of the belt (see FIG. 1).

As the material used for the tire cord, nylon, rayon, aramid, polyester, and the like may be mentioned as examples.

In general, the tire cord is rolled together with rubber components for bonding with rubber. Namely, a rolling process is involved in the manufacture process of a tire. However, in case a rolling process is applied for bonding of the tire cord and rubber in the tire manufacturing process, a process cost may increase, and due to rolling, the density of a tire may increase more than necessary, and thus, the weight of a tire may unnecessarily increases.

In the process of rolling rubber in the tire cord, solid rubber is generally used. However, it is difficult to make a product formed by rolling of solid rubber in the form of a thin film of 200 μm or less, particularly 5 μm to 30 μm, and in case such a product is used as the rubber reinforcing material, the thickness and weight of a tire may increase.

Recently, tire manufacturing companies have been trying to decrease the thickness of a rubber layer for ultralight weight of a tire and light weight of the reinforcing material. Rolling resistance (R/R) is related to the weight of a tire, and has a large influence on fuel consumption and carbon dioxide discharge of automobiles. For example, as the rolling resistance (R/R) is larger, energy required during running of an automobile increases. And, resistance to automobile rotation, slope, and acceleration is related to the weight of an automobile. Thus, studies for reducing the weight of automobiles through the reduction of tire weight, and thereby reducing energy consumption, are progressing.

DETAILED DESCRIPTION OF THE INVENTION

Technical Problem

It is an object of the invention to provide a rubber reinforcing material that has a thin thickness, and yet has excellent durability.

It is another object of the invention to provide a method for preparing a rubber reinforcing material that has a thin thickness, and yet has excellent durability.

It is still another object of the invention to provide a tire including the rubber reinforcing material.

Technical Solution

According to one embodiment of the invention, there is provided a rubber reinforcing material including
a fiber base;
an adhesive layer placed on the fiber base; and
a rubber compound layer placed on the adhesive layer,
wherein the rubber compound layer has a thickness of 2 μm to 200 μm, a t50 value of 150 to 220 seconds, and a t90 value of 300 to 350 seconds.

Herein, the t50 value is a time (seconds) required to reach 50% of the maximum crosslinking density of the rubber compound layer, measured by rheometer according to the ASTM D2084 standard test method, and the t90 value is a time (seconds) required to reach 90% of the maximum crosslinking density.

According to another embodiment of the invention, there is provided a method for preparing the rubber reinforcing material, including steps of:
preparing a fiber base,
forming an adhesive layer on the fiber base; and
coating a rubber compound solution on the adhesive layer and heat treating to form a rubber compound layer on the adhesive layer,
wherein the rubber compound solution is prepared by adding one component included in the rubber compound solution under 50 to 110° C. and 30 to 50 rpm, and sequentially mixing the other components while stirring for 30 to 120 seconds.

According to still another embodiment of the invention, there is provided a tire including the rubber reinforcing material.

Hereinafter, the rubber reinforcing material, a method for preparing the same, and a tire including the same according to the embodiments of the invention will be explained in detail.

Unless otherwise defined, all the technical terms and scientific terms used herein have the same meanings generally understood by a person having ordinary knowledge in the art. The terms used herein are only to effectively explain specific embodiments and are not intended to limit the invention.

A singular expression includes a plural expression thereof, unless it is expressly stated or obvious from the context that such is not intended.

As used herein, the term "comprise" is intended to designate the existence of a practiced characteristic, number, step, constructional element, or combinations thereof, and it is not intended to preclude the possibility of existence or addition of one or more other characteristics, numbers, steps, constructional elements, or combinations thereof.

Although various modifications can be made to the invention and the invention may have various forms, specific examples will be illustrated and explained in detail below. However, it should be understood that these are not intended to limit the invention to a specific disclosure, and that the invention includes all the modifications, equivalents, or replacements thereof without departing from the spirit and technical scope of the invention.

And, in case location relations of two parts are explained by cony, 'above', 'below', 'under', 'beside', and the like, other parts may be located between the two parts unless the expression 'right' or 'directly' is used.

And, in case time sequence is explained by 'after', 'subsequently', 'next', 'before', and the like, discontinuous cases may be included unless the expression 'right' or 'directly' is used.

And, the term cat least one' should be understood to include all the combinations that can be presented from one or more related items.

And, the terms including ordinal numbers such as "a first", "a second" and the like are used only to distinguish one constructional element from other constructional elements. For example, the first constructional element may be called the second constructional element, and similarly, the second constructional elements may be called the first constructional elements, without departing from the scope of the right of the invention.

I. Rubber Reinforcing Material

According to one embodiment of the invention, there is provided rubber reinforcing material including:
a fiber base;
an adhesive layer placed on the fiber base; and
a rubber compound layer placed on the adhesive layer,
wherein the rubber compound layer has a thickness of 2 μm to 200 μm, a t50 value of 150 to 220 seconds, and a t90 value of 300 to 350 seconds
(wherein the t50 value is a time (seconds) required to reach 50% of the maximum crosslinking density of the rubber compound layer, measured by rheometer according to the ASTM D2084 standard test method, and the t90 value is a time (seconds) required to reach 90% of the maximum crosslinking density).

As the result of continuous studies of the inventors, it was confirmed that the rubber reinforcing material including the rubber compound layer of the above properties has a thin thickness, and yet exhibits excellent durability.

Since the rubber reinforcing material of the above embodiment includes the rubber compound layer and exhibits uniform properties, and yet has excellent adhesive strength to rubber, it can be strongly bonded with rubber without passing through a rolling process in the manufacturing process of a tire. Thus, the rubber reinforcing agent enables reduction of tire manufacturing cost, and prevents an unnecessary increase in the density and weight of a tire due to rolling.

And, since the rubber reinforcing material has excellent adhesive strength to rubber, air pockets may decrease when manufacturing green tires, thereby reducing a defect rate of tires.

Since the rubber reinforcing material has a thin thickness, it meets the requirement of decreasing the thickness of a rubber layer for ultralight weight of a tire. Moreover, the rubber reinforcing material may reduce rolling resistance, and enables improvement in the fuel efficiency of automobiles. Particularly, the rubber reinforcing material enables improvement in the fuel efficiency and running performance of electric vehicles.

FIG. 2 and FIG. 4 are respectively a schematic cross-sectional view of the rubber reinforcing material (201, 301) according to one example of the invention.

The rubber reinforcing material (201, 301) includes a fiber base (210, 110), an adhesive layer (220) placed on the fiber base (210, 110) and a rubber compound layer (230) placed on the adhesive layer (220).

According to the embodiment of the invention, the fiber base may include at least one of fiber yarn such as ply yarn (110), and a textile base (210) woven with warp yarn and weft yarn.

The fiber yarn may be ply yarn (110) formed by secondary twisting of one or more primary twisted yarns (111, 112). The primary twisted yarn may include one or more materials selected from the group consisting of nylon, rayon, aramid, polyester, and cotton.

The ply yarn includes hybrid ply yarn formed by secondary twisting of primary twisted yarns of different materials. For example, the hybrid ply yarn may include primary twisted nylon yarn and primary twisted aramid yarn.

Referring to FIG. 3, the ply yarn (110) includes primary twisted yarn 1 (111) and primary twisted yarn 2 (112), wherein the primary twisted yarn 1 (111) and the primary twisted yarn 2 (112) are secondarily twisted together. The primary twisted yarn 1 (111) has a first twist direction, the primary twisted yarn 2 (112) has a second twist direction, and the primary twisted yarn 1 (111) and the primary twisted yarn 2 (112) are secondarily twisted together in a third twist direction. Herein, the second twist direction may be identical to the first twist direction, and the third twist direction may be opposite to the first twist direction. However, the twist directions are not limited thereto. The first twist number and the second twist number may be identical to or different from each other. The primary twisted yarn 1 (111) and the primary twisted yarn 2 (112) may respectively have a twist number of, for example, 150 to 500 TPM (twists per meter).

In the textile base (210), the warp yarn and the weft yarn may respectively include one or more materials selected from the group consisting of nylon, rayon, aramid, polyester, and cotton.

Preferably, the warp yarn may include one or more materials selected from the group consisting of nylon, rayon, aramid, and polyester. And preferably, the weft yarn may include one or more materials selected from the group consisting of nylon, rayon, aramid, polyester, and cotton.

Meanwhile, the rubber reinforcing material (201, 301) includes an adhesive layer (220) placed on the fiber base (210, 110).

The adhesive layer includes resorcinol-formaldehyde-latex (RFL).

For example, the adhesive layer (220) may be formed by an adhesion coating solution including resorcinol-formaldehyde-latex (RFL) and a solvent.

The resorcinol-formaldehyde-latex functions as an adhesive component. The resorcinol-formaldehyde-latex improves affinity and adhesive strength particularly between the fiber base (210, 110) and rubber components. Thereby, the adhesive layer (220) improves internal adhesion strength between the fiber base (210, 110) and the rubber compound layer (230), and improves external adhesion strength between the rubber reinforcing material (201, 301) and the rubber (for example, a tread and the like).

Thereby, the fiber base (210, 110) and the rubber compound layer (230) may be stably attached to each other without being separated, thereby reducing a defect rate in the manufacturing process of a tire (101).

Meanwhile, the rubber reinforcing material (201, 301) includes a rubber compound layer (230) placed on the adhesive layer (220).

The rubber compound layer (230) may include one or more elastic polymers selected from the group consisting of natural rubber and synthetic rubber.

The rubber compound layer (230) may be formed by coating a liquid rubber compound solution including the elastic polymer on the adhesive layer (220). Thereby, the rubber reinforcing material (201, 301) may have a rubber compound layer (230) with a thin thickness, which is difficult to achieve through the rolling process using solid rubber. As the thickness of the rubber compound layer (230) becomes thin, it may contribute to weight reduction of the rubber reinforcing material (201, 301) including the same and a tire including the rubber reinforcing material (201, 301).

The rubber compound layer (230) may be formed from a rubber compound solution including elastic polymer, sulfur, a vulcanization accelerator, and a vulcanization retarder.

The elastic polymer may be one or more rubber selected from the group consisting of natural rubber and synthetic rubber. For example, the elastic polymer may be one or more rubbers selected from the group consisting of natural rubber (NR), styrene butadiene rubber (SBR), butadiene rubber (BR), chloroprene rubber (CR), isobutylene rubber (IBR), isoprene rubber (IR), nitrile rubber (NBR), butyl rubber, and neoprene rubber.

The rubber compound solution may further include one or more additives selected from the group consisting of a peptizer, carbon black, process oil, an activator, an antiaging agent, petroleum resin, and an antioxidant.

The rubber compound solution may include at least one solvents selected from the group consisting of toluene, naphtha, methanol, xylene, and tetrahydrofuran.

The rubber compound layer (230) may have a thickness (t1) of 2 μm to 200 μm, or 5 μm to 150 μm, or 5 μm to 100 μm, or 5 μm to 50 μm, or 10 μm to 40 μm, or 20 μm to 40μm.

As shown in FIG. 2, the thickness (t1) of the rubber compound layer (230) is measured as the longest distance from one side of the rubber compound layer (230) adjoining the adhesive layer (220) to another side of the rubber compound layer (230) positioned on the opposite side of the adhesive layer (220).

In the existing rubber reinforcing material, a rubber base is rolled on a fiber base to form a rubber layer, and thus, the rubber layer generally has a thickness of 1 mm or more, or at least 0.8 mm or more.

To the contrary, since the rubber compound layer (230) is formed by the rubber compound solution, it may have a thin thickness of 200 μm or less. Thus, the entire thickness of the rubber reinforcing material (201, 301) may become thin, and moreover, the thickness of a tire (101) including the rubber reinforcing material (201, 301) may become thin.

If the thickness of the rubber compound layer (230) is too thin, the rubber compound layer (230) may not have sufficient pressure sensitive adhesion and adhesive strength, and thus, a defect rate may increase when manufacturing tires, and durability of a tire may be deteriorated. Thus, it is preferable that the rubber compound layer (230) has a thickness (t1) of 2 μm or more, or 5 μm or more, or 10 μm or more, or 20 μm or more.

However, if the thickness of the rubber compound layer (230) is too thick, it may not be appropriate for the object of the invention to provide rubber reinforcing material (201, 301) with a thin thickness. Particularly, if the thickness of the rubber compound layer (230) is too thick, bubbles may be formed in the rubber compound layer (230) during the evaporation process of a solvent, and thus, it may be difficult for the rubber reinforcing material (201, 301) to have a uniform thickness. And, air pockets may be generated in a tire applying the same, and thus, tire quality may be deteriorated and a defect rate may increase. Further, the coating operation should be conducted several times so as to form the rubber compound layer (230) to be thick, and thus, process efficiency may be deteriorated. Thus, it is preferable that the rubber compound layer (230) has a thickness (t1) of 200 μm or less, or 150 μm or less, or 100 μm or less, or 50 μm or less, or 40 μm or less.

Particularly, the rubber compound layer (230) may have a t50 value of 150 to 220 seconds, and a t90 value of 300 to 350 seconds.

Herein, the t50 value is a time (seconds) required to reach 50% of the maximum crosslinking density of the rubber compound layer, measured by rheometer according to the ASTM D2084 standard test method, and the t90 value is a time (seconds) required to reach 90% of the maximum crosslinking density. The t90 value means an optimum time of vulcanization, and the t50 value means a half-time of vulcanization.

The vulcanization characteristics such as t50 and t90 values may be measured using any methods commonly used in the art. For example, the vulcanization characteristics may be measured using a rheometer (a so-called "vulcameter"). The vulcanization characteristics may be measured referring to a document ⌈Matador Rubber s.r.o (2007) Test Methods of Rubber Materials and Products. VERT, pp. 71-76⌋.

According to the embodiment of the invention, in order for the rubber compound layer (230) to be formed at an appropriate vulcanization speed to uniformly exhibit properties (particularly, an excellent adhesion property) aimed for in the invention, it is preferable that the t90 value is 300 seconds or more and the t50 value is 150 seconds or more. If the t90 value and the t50 value are too small, the vulcanization initiation time of rubber may too quick, and thus, adhesive strength may be decreased due to early vulcanization.

However, if the optimum time of vulcanization and the half-time of vulcanization for which the rubber compound layer (230) is formed is excessively prolonged, non-vulcanization may be generated. Thus, it is preferable that the t90 value is 350 seconds or less, and the t50 value is 220 seconds or less.

Preferably, the t90 value of the rubber compound layer (230) may be 300 seconds to 350 seconds, or 305 seconds to 345 seconds, or 305 seconds to 340 seconds, or 310 seconds to 340 seconds. In addition, the t50 value of the rubber compound layer (230) may be 150 seconds to 220 seconds, or 160 seconds to 220 seconds, or 170 seconds to 210 seconds, or 180 seconds to 210 seconds.

Meanwhile, automobile tires are required to have intrinsic surface resistance of less than $1.0 \times 10^9$ ohm/sq according to the electrostatic standard of Fire Safety Standard (KFS 440) so as to prevent electrostatic safety accidents of automobiles.

According to the embodiment of the invention, the rubber compound layer (230) may have intrinsic surface resistance of $4.0 \times 10^8$ ohm/sq to $8.0 \times 10^8$ ohm/sq, thus exhibiting the electrostatic property satisfying the above standard.

Preferably, the rubber compound layer (230) may have intrinsic surface resistance of $4.0 \times 10^8$ ohm/sq to $8.0 \times 10^8$ ohm/sq, or $4.1 \times 10^8$ ohm/sq, to $7.8 \times 10^8$ ohm/sq, or $4.2 \times 10^8$ ohm/sq to $7.5 \times 10^8$ ohm/sq.

According to the embodiment of the invention, the rubber compound layer (230) may have an excellent adhesion property. The adhesion property may be represented by adhesive strength. For example, the rubber compound layer (230) may exhibit adhesive strength of 17.0 N/inch or more, or 17.0 N/inch to 17.5 N/inch according to the ASTM D4393 standard test method. Herein, the adhesive strength is a value measured by a PEEL test method (Cross Head Speed: 125 mm/min) using an Instron clamp (Grip, CAT. No. 2712-041).

In case the rubber compound layer (230) has adhesive strength of 17.0 N/inch or more, the rubber reinforcing material may be attached to the rubber without running down in a tire manufacturing process, and thus, the tire manufacturing process may be stably progressed. In case the rubber compound layer (230) has adhesive strength of less than 17.0 N/inch, a defect may be generated due to running down of the rubber reinforcing material in a tire manufacturing process, and when manufacturing a green tire, air pockets may be generated and the tire defect rate may increase.

The rubber reinforcing material (201, 301) according to the above embodiment may be applied for at least one of a cap ply (90), a belt (50), and a carcass (70) of a tire.

II. Method for Preparing Rubber Reinforcing Material

According to another embodiment of the invention, there is provided a method for preparing the rubber reinforcing material, including steps of:

preparing a fiber base;

forming an adhesive layer on the fiber base; and coating a rubber compound solution on the adhesive layer and heat treating to form a rubber compound layer on the adhesive layer, wherein the rubber compound solution is prepared by adding one component included in the rubber compound solution under 50 to 110° C. and 30 to 50 rpm conditions, and sequentially mixing the other components while stirring for 30 to 120 seconds.

To the details of the fiber base (210), explanations of the 「I. rubber reinforcing materials」 are applied.

A step of forming an adhesive layer (220) on the fiber base (210, 110) is conducted.

The adhesive layer (220) may be formed by an adhesive coating solution including resorcinol-formaldehyde-latex (RFL) and a solvent.

For example, the adhesive coating solution may be coated on the fiber base (210, 110) by immersing the fiber base (210, 110) in the adhesive coating solution. Alternatively, the immersion process may be achieved by passing the fiber base (210, 110) through the adhesive coating solution. Such immersion may be conducted in an immersion device in which tension, immersion time, and temperature can be controlled.

In addition, the adhesive coating solution may be coated on the fiber base (210, 110) by coating using a blade or coater, or by spraying using a sprayer.

The step of forming the adhesive layer (220) may further include coating the adhesive coating solution on the fiber base (210, 110), and heat treating at 130° C. to 250° C. for 80 to 120 seconds. The heat treatment may be conducted in a common apparatus for heat treatment. By the heat treatment, resorcinol-formaldehyde-latex (RFL) may be cured or fixed to form an adhesive layer (220). By such heat treatment, the adhesive layer (220) can be formed more stably.

Subsequently, a step of applying the rubber compound solution on the adhesive layer (220) and heat treating to form a rubber compound layer (230) on the adhesive layer (220) is conducted.

The rubber compound solution may include an elastic polymer, sulfur, a vulcanization accelerator, and a vulcanization retarder.

The elastic polymer may be one or more rubber selected from the group consisting of natural rubber and synthetic rubber. For example, the elastic polymer may be one or more rubbers selected from the group consisting of natural rubber (NR), styrene butadiene rubber (SBR), butadiene rubber (BR), chloroprene rubber (CR), isobutylene rubber (IBR), isoprene rubber (IR), nitrile rubber (NBR), butyl rubber, and neoprene rubber.

According to the embodiment of the invention, it is preferable that the rubber compound solution includes 60 to 70 PHR (parts per hundred rubber) of natural rubber, 30 to 40 PHR of styrene-butadiene rubber, 1 to 5 PHR of sulfur, 1 to 5 PHR of a vulcanization accelerator, and 0.1 to 0.5 PHR of a vulcanization retarder.

Namely, in order to form the rubber compound layer (230) with uniform thickness and properties, it is preferable that the rubber compound solution includes the components of the above content ranges. A rubber compound solution that does not satisfy the above content ranges may not be coated to uniform thickness, and thus, deterioration of fatigue performance may be induced. And, if the above content ranges are not satisfied, the rubber compound layer (230) may not have a t50 value of 150 seconds to 220 seconds and a t90 value of 300 seconds to 350 seconds, resulting in deterioration of the adhesion property.

The kinds of the vulcanization accelerator and vulcanization retarder are not specifically limited. Any compounds that may act as the vulcanization accelerator and vulcanization retarder in the art may be applied. As non-limiting examples, as the vulcanization accelerator, N-tert-butyl-2-benzothiazole-sulfenamide (TBBS), 1,3-diphenylguanidine (DPG), and the like may be applied, and as the vulcanization retarder, N-(cyclohexylthio)phthalimide and the like may be applied.

Particularly, in order to form the rubber compound layer (230) with a very thin thickness, and yet disperse the constructional components uniformly, it is required to establish temperature, stirring speed, and stirring time after adding each component in the process of preparing the rubber compound solution.

According to the embodiment of the invention, it is preferable that the rubber compound solution is prepared by adding one component included in the rubber compound solution under 50 to 110° C. and 30 to 50 rpm, and then sequentially mixing the other components while stirring for 30 to 120 seconds.

In case the process of preparing the rubber compound solution is conducted at a temperature of less than 50° C., or at a stirring speed less than 30 rpm, or for a stirring time less than 30 seconds, it may be difficult to obtain a highly dispersed rubber compound solution. In case the components included in the rubber compound solution are not uniformly dispersed, the rubber compound solution may not be coated to a uniform thickness, and thus deterioration of fatigue performance and adhesion property may be induced.

However, in case the process of preparing the rubber compound solution is conducted at a temperature greater than 110° C., or at a stirring speed of greater than 50 rpm, or for a stirring time of greater than 120 seconds, the rubber compound layer may not have a t50 value of 150 seconds to 220 seconds and a t90 value of 300 seconds to 350 seconds, and an optimum level of adhesion property may not be obtained.

For the preparation of the rubber compound solution, common mixing devices such as a propeller type of agitator may be used. When using the mixing device, a stirring speed may be adjusted considering the diameter of an agitator, a density of the medium, a stirring force to be transferred to the medium, and the like. As a non-limiting example, in a preparation example of the invention, a propeller type of agitator with a capacity of 10 L (container diameter 100 cm, propeller diameter 80 cm, propeller length 120 cm) was used for the preparation of the rubber compound solution.

Preferably, the temperature, stirring speed, and stirring time may be adjusted according to the properties of the components included in the rubber compound solution.

As a non-limiting example, the rubber compound solution may be prepared by mixing 60 to 70 PHR of natural rubber at a temperature of 60 to 70° C. under stirring at 30 to 40 rpm for 100 to 120 seconds (step (a)), adding 30 to 40 PHR of styrene-butadiene rubber to the composition including the mixture of step (a), and then mixing them at a temperature of 100 to 110° C. under stirring at 30 to 40 rpm for 30 to 60 seconds (step (b)), adding 1 to 5 PHR of sulfur and 0.5 to 2.5 PHR of a first vulcanization accelerator to the composition including the mixture of step (b), and then mixing them at a temperature of 50 to 60° C. under stirring at 30 to 40 rpm for 30 to 60 seconds (step (c)), and adding 0.5 to 2.5 PHR of a second vulcanization accelerator and 0.1 to 0.5 PHR of a vulcanization retarder to the composition including the mixture of step (c), and then mixing them at a temperature of 70 to 80° C. under stirring at 40 to 45 rpm for 30 to 60 seconds (step (d)).

Meanwhile, the rubber compound solution may further include additives commonly used in the art.

For example, the rubber compound solution may further include one or more additives selected from the group consisting of a peptizer, carbon black, a process oil, an activator, an antiaging agent, a petroleum resin, and an antioxidant.

The kinds of the peptizer, carbon black, process oil, activator, antiaging agent, petroleum resin, and antioxidant are not specifically limited. Any compounds that can act as the additives in the art may be applied. As non-limiting examples, as the peptizer, 2,2'-dibenzamidodiphenyl disulfide and the like may be used; as the activator, zinc oxide (ZnO), stearic acid, and the like may be used; as the antiaging agent, polymerized 2,2,4-trimethyl-1,2-dihydroquinoline (TMDQ), N-(1,3-dimethylbutyl)-N'-phenyl-p-phenylenediamine (6PPD), and the like may be used; and as the antioxidant, wax and the like may be used.

As non-limiting examples, the rubber compound solution further including the additives may be prepared by mixing 60 to 70 PHR of natural rubber and 0.1 to 0.5 PHR of a peptizer at a temperature of 60 to 70° C. under stirring at 30 to 40 rpm for 100 to 120 seconds (step (1)), adding 30 to 40 PHR of styrene-butadiene rubber to the composition including the mixture of step (1), and then mixing them at a temperature of 100 to 110° C. under stirring at 30 to 40 rpm for 30 to 60 seconds (step (2)), adding 50 to 55 PHR of carbon black and 5 to 10 PHR of a process oil to the composition including the mixture of step (2), and then mixing at a temperature of 90 to 100° C. under stirring at 25 to 35 rpm for 30 to 60 seconds (step (3)), adding 5 to 10 PHR of an activator and 0.5 to 2.5 PHR of first antiaging agent to the composition including the mixture of step (3), and then mixing at a temperature of 100 to 110° C. under stirring at 35 to 45 rpm for 30 to 60 seconds (step (4)), adding 5 to 10 PHR of petroleum resin, 0.5 to 2.5 PHR of a second antiaging agent and 1 to 5 PHR of an antioxidant to the composition including the mixture of step (4), and then mixing at a temperature of 90 to 100° C. under stirring at 30 to 40 rpm for 30 to 60 seconds (step (5)), adding 1 to 5 PHR of sulfur and 0.5 to 2.5 PHR of a first vulcanization accelerator to the composition including the mixture of step (5), and then mixing them at a temperature of 50 to 60° C. under stirring at 30 to 40 rpm for 30 to 60 seconds (step (6)), and adding 0.5 to 2.5 PHR of a second vulcanization accelerator and 0.1 to 0.5 PHR of a vulcanization retarder to the composition including the mixture of step (6), and then mixing them at a temperature of 70 to 80° C. under stirring at 40 to 45 rpm for 30 to 60 seconds (step (7)).

The rubber compound solution may further include a solvent that can dissolve the elastic polymer. For example, the solvent may include at least one selected from the group consisting of toluene, naphtha, methanol, xylene, and tetrahydrofuran.

A method of coating the rubber compound solution on the adhesive layer (220) is not specifically limited, and known coating methods may be applied.

For example, in order to form a rubber compound layer (230), a fiber base (210, 110) on which an adhesive layer (220) is formed may be immersed in the rubber compound solution. By immersion, the rubber compound solution may be coated on the adhesive layer (220).

As a coating method, gravure coating, micro-gravure coating, comma coating, and the like may be applied. For example, by comma coating using a comma coater, the rubber compound solution may be coated on the adhesive layer (220). Herein, the coating may be conducted at a temperature capable of evaporating solvents, for example, at a temperature of 65° C. to 100° C.

After coating the rubber compound solution on the adhesive layer (220), heat treatment is further conducted. The heat treatment may be conducted in a common apparatus for heat treatment. For the heat treatment, heat may be applied at a temperature of 50° C. to 160° C. for 30 to 150 seconds.

The amount of the rubber compound solution coated per unit area may be 75 g/m² to 300 g/m², or 100 g/m² to 200 g/m². By controlling the amount of the rubber compound solution coated per unit area of the adhesive layer (220) within the above range, the rubber reinforcing material (201, 301) that has a thin thickness, and yet has an excellent adhesion property and durability can be prepared.

The rubber compound layer (230) may have a thickness (t1) of 2 μm to 200 μm, or 5 μm to 150 μm, or 5 μm to 100 μm, or 5 μm to 50 μm, or 10 μm to 40 μm, or 20 μm to 40μm.

Meanwhile, after formation of the rubber compound layer (230), a slitting step may be optionally conducted. The slitting step is a step of cutting the rubber reinforcing material (201, 301) prepared in the form of a plate, as necessary or according to the purpose of use. The slitting may be conducted using a common cutter knife or heating knife.

The rubber reinforcing material (201, 301) prepared by the above method may be wound on a winder.

III. Tire

According to still another embodiment of the invention, there is provided a tire including the above-explained rubber reinforcing material.

FIG. 1 is a partial cutting view of the tire (101) according to one example of the invention.

Referring to FIG. 1, a tire (101) includes a tread (10), a shoulder (20), a side wall (30), a bead (40), a belt (50), an inner liner (60), a carcass (70), and a cap ply (90).

The tread (10) is a part directly contacting the road surface. The tread (10) is a strong rubber layer attached to the outside of the cap ply (90), and consists of rubber having excellent abrasion resistance. The tread (10) performs a direct function for delivering driving force and braking force of an automobile to the ground. In the tread (10) region, grooves (80) are formed.

The shoulder (20) is an edge part, and is connected with a side wall (30). The shoulder (20) is one of the weakest parts of a tire in addition to the side wall (30).

The side wall (30) is a side part of a tire (101) connecting the tread (10) and the bead (40), and it protects the carcass (70) and provides side stability to a tire.

The bead (40) is a region in which steel wire winding the end part of carcass (70) is included, wherein the steel wire is coated with rubber and covers the cord. The bead (40) functions for fitting and fixing a tire (101) to a wheel rim.

The belt (50) is a coat layer positioned between the tread (10) and the carcass (70). The belt (50) functions for preventing damage to internal constructional elements such as the carcass (70) by external impact or external conditions, and it maintains the shape of tread (10) to be flat, thereby maintaining contact of a tire (101) and a road surface in the best condition. The belt (50) may include the rubber reinforcing material (201) according to the embodiment of the invention (See FIG. 2).

The inner liner (60) is used instead of a tube in a tubeless tire, and is made of a special rubber with little or no air permeability. The inner liner (60) prevents leakage of air filled in a tire (101)

The carcass (70) is formed of overlapping sheets of cords made of a high strength synthetic fiber, and is an important part for forming the backbone of a tire (101). The carcass (70) functions for withstanding the load and impact applied to a tire (101) and maintaining air pressure. The carcass (70) may include the rubber reinforcing material (201) according to the embodiment of the invention.

The groove (80) refers to a large void in the tread region. The groove (80) functions for increasing drainability while running on a wet road surface and improving a grip force.

The cap ply (90) is a protection layer under the tread (10), and protects other constructional elements inside. The cap ply (90) is necessarily applied for high speed running vehicles. Particularly, as the running speed of a vehicle increases, the belt part of a tire is deformed to deteriorate ride comfort, and thus, the importance of the cap ply (90) preventing the deformation of the belt part is increased. The cap ply (90) may include the rubber reinforcing material (201) according to the embodiment of the invention.

The tire (101) according to one embodiment of the invention includes a rubber reinforcing material (201). The rubber reinforcing material (201) may be applied for at least one of a cap ply (90), a belt (50), and a carcass (70).

Advantageous Effects

According to this invention, there is provided rubber reinforcing material that has a thin thickness and light weight, and yet has excellent durability. The reinforcing material not only reduces the weight of a tire, but also enables realization of improved rolling resistance.

DESCRIPTION OF DRAWINGS

FIG. 1 is a partial cutting view of the tire according to one example of the invention.

FIG. 2 is a schematic cross-sectional view of the rubber reinforcing material according to one example of the invention.

FIG. 3 is a schematic diagram of the ply yarn.

FIG. 4 is a schematic cross-sectional view of the rubber reinforcing material according to another example of the invention.

<Reference numerals>

| | |
|---|---|
| 10: tread | 20: shoulder |
| 30: side wall | 40: bead |
| 50: belt | 60: inner liner |
| 70: carcass | 80: groove |
| 90: cap ply | 101: tire |
| 110: ply yarn | 111: primary twisted yarn 1 |
| 112: primary twisted yarn 2 | |
| 201, 301: rubber reinforcing material | |
| 210: textile base | 220: adhesive layer |
| 230: rubber compound layer | |

DETAILED DESCRIPTION OF THE EMBODIMENTS

Hereinafter, preferable examples are presented for better understanding of the invention. However, these examples are presented only as illustrations of the invention, and the invention is not limited thereby.

Preparation Example 1

According to step (1) to step (7) below, a rubber compound solution was prepared.

For the preparation of the rubber compound solution, a propeller type of agitator with a capacity of 10 L (container diameter 100 cm, propeller diameter 80 cm, propeller length 120 cm, model name SUPER-MIX MR203, manufactured by HADO Co., Ltd.) was used.

60 PHR of natural rubber (20 Grade according to TSR classification standard, SIR20) and 0.1 PHR of a peptizer (Struktol A86) were mixed at a temperature of 70° C. under stirring at 40 rpm for 120 seconds [step (1)].

To the mixture obtained in step (1), 40 PHR of styrene-butadiene rubber (SBR-1502) was added, and then they were mixed at a temperature of 110° C. under stirring at 40 rpm for 60 seconds [step (2)].

To the mixture obtained in step (2), 50 PHR of carbon black (Corax® N330) and 6 PHR of a process oil (paraffin-based, P-2, MICHANG) were added, and then they were mixed at a temperature of 100° C. under stirring at 35 rpm for 60 seconds [step (3)].

To the mixture obtained in step (3), 5 PHR of a first activator (ZnO), 2 PHR of a second activator (stearic acid), and 1.5 PHR of first antiaging agent (TMDQ) were added, and then, they were mixed at a temperature of 110° C. under stirring at 45 rpm for 60 seconds [step (4)].

To the mixture obtained in step (4), 7 PHR of a petroleum resin (HIKOTACK® P-90), 1 PHR of a second antiaging agent (6PPD), and 2.5 PHR of an antioxidant (wax) were added, and then they were mixed at a temperature of 100° C. under stirring at 40 rpm for 60 seconds [step (5)].

The mixture obtained in step (5) was left at room temperature (25° C.) for 2 hours, and then mixed. Subsequently, it was mixed at a temperature of 70° C. under stirring at 40 rpm for 120 seconds [step (5.5)].

To the mixture obtained in step (5.5), 3.4 PHR of sulfur and 0.85 PHR of a first 1 vulcanization accelerator (TBBS) were added, and then they were mixed at a temperature of 60° C. under stirring at 40 rpm for 30 seconds [step (6)].

To the mixture obtained in step (6), 0.6 PHR of a second vulcanization accelerator (DPG) and 0.2 PHR of a vulcanization retarder (N-(cyclohexylthio)phthalimide) were added, and then they were mixed at a temperature of 80° C. under stirring at 45 rpm for 30 seconds [step (7)].

Preparation Example 2

A rubber compound solution was prepared by the same method as Preparation Example 1, except that the temperatures in step (1), step (2), step (6), and step (7) were changed as follows.
step (1): 60° C.
step (2): 110° C.
step (6): 50° C.
step (7): 70° C.

Preparation Example 3

A rubber compound solution was prepared by the same method as Preparation Example 1, except that the stirring speeds in step (1), step (2), step (6), and step (7) were changed as follows.
step (1): 35 rpm
step (2): 35 rpm
step (6): 30 rpm
step (7): 40 rpm Preparation Example 4

A rubber compound solution was prepared by the same method as Preparation Example 1, except that the mixing times of the mixture in step (1), step (2), step (6), and step (7) were changed as follows.
step (1): 100 seconds
step (2): 45 seconds
step (6): 60 seconds
step (7): 60 seconds Preparation Example 5

A rubber compound solution was prepared by the same method as Preparation Example 1, except that the contents of natural rubber, styrene-butadiene rubber, and carbon black in step (1), step (2), and step (3) were changed as follows.
step (1): natural rubber 70 PHR
step (2): styrene-butadiene rubber 30 PHR
step (3): carbon black 55 PHR Comparative Preparation Example 1

A rubber compound solution was prepared by the same method as Preparation Example 1, except that the temperatures in step (6) and step (7) were changed as follows.
step (6): 45° C.
step (7): 70° C.

Comparative Preparation Example 2

A rubber compound solution was prepared by the same method as Preparation Example 1, except that the temperatures in step (1), step (2), step (6), and step (7) were changed as follows.
step (1): 75° C.
step (2): 120° C.
step (6): 70° C.
step (7): 90° C.

Comparative Preparation Example 3

A rubber compound solution was prepared by the same method as Preparation Example 1, except that the stirring speeds (rpm) in step (1), step (2), step (6), and step (7) were changed as follows.
step (1): 25 rpm
step (2): 35 rpm
step (6): 35 rpm
step (7): 40 rpm Comparative Preparation Example 4

A rubber compound solution was prepared by the same method as Preparation Example 1, except that the stirring speeds (rpm) in step (1), step (2), step (6), and step (7) were changed as follows.
step (1): 45 rpm
step (2): 40 rpm
step (6): 45 rpm
step (7): 55 rpm Comparative Preparation Example 5

A rubber compound solution was prepared by the same method as Preparation Example 1, except that the mixing times in step (1), step (2), step (6), and step (7) were changed as follows.
step (1): 100 seconds
step (2): 120 seconds
step (6): 150 seconds
step (7): 60 seconds Examples 1 to 5

(1) Preparation of Textile Base

Nylon filaments (primary twisted yarn 1) of 1260 de and aramid filaments (primary twisted yarn 2) of 1500 de were prepared. Using a cable corder, primary twisting (counterclockwise direction) and secondary twisting (clockwise direction) of the filaments 1 and 2 were simultaneously conducted to prepare a ply yarn (110) having a twist number of 300 TPM.

Using the ply yarn (110) as a warp yarn and cotton yarn as a weft yarn, fabric was woven to prepare a textile base (210) with a thickness of 0.04 mm.

(2) Formation of Adhesive Layer

The textile base (210) was dipped in an adhesive coating solution including 15 wt % of resorcinol-formaldehyde-latex (RFL) and 85 wt % of solvent (water, $H_2O$), and then heat treated at 150° C. for 100 seconds to form an adhesive layer (220).

(3) Formation of Rubber Compound Layer

Subsequently, using a comma coater, each rubber compound solution of the preparation examples was coated on the adhesive layer (220) in the coating amount per unit area of 120~130 g/m², and then the solvent was evaporated at a temperature of 70° C. to prepare a rubber reinforcing material (201) in which a rubber compound layer (230) is formed.

(4) Cutting

The rubber reinforcing material (201) was cut to a width of 10 mm, thus preparing a rubber reinforcing material for a cap ply (90). For the cutting, a cutter knife was used.

(5) Manufacture of Tire

The cut rubber reinforcing material was applied for the manufacture of a 205/55R16 standard tire. For the manufacture of a tire, a body ply including a 1300De/2 ply HMLS tire cord and a steel cord belt were used.

Specifically, rubber for the body ply was laminated on an inner liner rubber, a bead wire, and a belt part were laminated, and then the above-prepared rubber reinforcing material was applied, and rubber layers for the formation of tread part, shoulder part, and side wall part were sequentially formed to manufacture a green tire. The green tire was put in a vulcanization mold, and vulcanized at 170° C. for 15 minutes to manufacture a tire.

Comparative Examples 1 to 5

Rubber reinforcing materials and tires including the same were prepared by the same method as Examples 1 to 5, except that, when forming the rubber compound layer, each rubber compound solution obtained in comparative preparation examples was used as a rubber compound solution.

Experimental Example (1) Thickness

In each rubber reinforcing material according to examples and comparative examples, the thickness (t1) of the fiber base and the rubber compound layer were measured using a vernier caliper of Mitutoyo Corporation.

(2) Vulcanization Characteristics of Rubber Compound Layer (t50, t90)

From each rubber reinforcing material according to the examples and comparative examples, a specimen of the rubber compound layer was collected. According to the ASTM D2084 standard test method, t50 and t90 values of the specimen were measured using a rheometer (MDR 2000, Alpha Technologies).

(3) Pressure-Sensitive Tack of Adhesives

According to the ASTM D2979 standard test method, pressure-sensitive tack of adhesives of the rubber compound layer were measured under the following conditions.

cylinder diameter: 10 mm
load: 300 gf
detachment speed: 5 mm/min
start load: 10 gf
loading speed at the beginning of test: 10 mm/min
target load-reaching speed: 0.2 mm/min
maintenance time: 20 s (4) Adhesive Strength According to the ASTM D4393 standard test method, strap peel adhesion of the rubber compound layer was tested. The test was conducted at a cross head speed of 125 mm/min using an Instron clamp (Grip, CAT. No. 2712-041).

(5) Fatigue Strength Maintenance Rate

Fatigue strength maintenance rate was measured through a bending fatigue test. A specimen was prepared with a length of 30 cm and a width of 1 inch. Vulcanization was conducted at 170° C. for 15 minutes. Before the test, the specimen was installed in a pulley of a bending fatigue tester, and then left at 100° C. for 30 minutes. Further, the specimen was bent for 25,000 cycles under conditions of 150 RPM, 100° C., and a pulley size 1 inch. Herein, the pulley size means the diameter of pulley on which the specimen is hung. Adhesive strength of the specimen after running, compared to the adhesive strength before running, is defined as fatigue strength maintenance rate.

(6) Intrinsic Surface Resistance

For the specimen prepared with a length of 30 cm and a width of 1 inch, intrinsic surface resistance was measured using an electric resistance measuring device (model name: Insulation Tester 1550C, manufactured by FLUKE).

TABLE 1

| | | Rubber reinforcing material | | | | |
|---|---|---|---|---|---|---|
| | | Example 1 | Example 2 | Example 3 | Example 4 | Example 5 |
| | | Rubber compound solution | | | | |
| | | Preparation Example 1 | Preparation Example 2 | Preparation Example 3 | Preparation Example 4 | Preparation Example 5 |
| Rubber compound layer | Thickness (μm) | 40 | 40 | 40 | 40 | 40 |
| | t50 (s) | 208 | 209 | 205 | 206 | 181 |
| | t90 (s) | 335 | 336 | 333 | 334 | 311 |
| | Pressure-sensitive adhesion (N/inch) | 209.8 | 210.8 | 208.1 | 212.2 | 209.6 |
| | Adhesive strength (N/inch) | 17.2 | 17.0 | 17.2 | 17.5 | 17.2 |
| | Fatigue strength maintenance rate (%) | 100 | 100 | 101 | 100 | 101 |
| | Intrinsic surface resistance (ohm/sq) | $7.3 \times 10^8$ | $7.0 \times 10^8$ | $6.9 \times 10^8$ | $6.8 \times 10^8$ | $4.3 \times 10^8$ |

TABLE 2

| | | Rubber reinforcing material | | | | |
|---|---|---|---|---|---|---|
| | | Comparative Example 1 | Comparative Example 2 | Comparative Example 3 | Comparative Example 4 | Comparative Example 5 |
| | | Rubber compound solution | | | | |
| | | Comparative Preparation Example 1 | Comparative Preparation Example 2 | Comparative Preparation Example 3 | Comparative Preparation Example 4 | Comparative Preparation Example 5 |
| Rubber compound layer | Thickness (μm) | 42 | 43 | 43 | 44 | 46 |
| | t50 (s) | 222 | 140 | 233 | 145 | 135 |
| | t90 (s) | 370 | 298 | 375 | 289 | 280 |
| | Pressure sensitive adhesion (N/inch) | 191.4 | 185.5 | 184.3 | 177.5 | 164 |
| | Adhesive property (N/inch) | 16.3 | 16.0 | 16.1 | 16.0 | 15.9 |
| | Fatigue strength maintenance rate (%) | 96 | 95 | 93 | 92 | 95 |
| | Intrinsic surface resistance (ohm/sq) | $6.2 \times 10^8$ | $6.0 \times 10^8$ | $5.1 \times 10^8$ | $8.1 \times 10^8$ | $7.0 \times 10^8$ |

Referring to Tables 1 and 2, it was confirmed that the rubber compound layer formed using each rubber compound solution of Preparation Examples 1 to 5 has excellent vulcanization characteristics (t50, t90), pressure-sensitive adhesion, and adhesive strength, and yet has a high fatigue strength maintenance rate and low intrinsic surface resistance, compared to those formed using the rubber compound solution of Comparative Preparation Example 1 to 5.

(7) Property Evaluation of Tire

Using a tire cord prepared by a rolling process (using two-ply yarn made of nylon with fineness of 840 denier as a warp yarn, warp yarn density of 25/inch), a 205/60 R16 standard tire was manufactured as a reference example.

For the tires of the reference example and Example 1, the following properties were measured. The property values of the tire of Example 1 is a value converted based on the property value (100%) of the reference example.

material weight: the weights of rubber reinforcing material of Example 1 and the tire cord of the reference example tire weight: weights of the tires of Example 1 and the reference example high speed running performance: measured according to the US FMVSS 139H standard test method Durability I: measured according to the US FMVSS 139E standard test method Durability II: measured according to the Europe ECE-R119 standard test method Rolling resistance (RRC): measured according to the ISO 28580 standard test method

TABLE 3

| Tire | Example 1 (index) | Reference Example (index) |
|---|---|---|
| Material weight | 30 | 100 |
| Tire weight | 98 | 100 |
| High speed running performance | 102 | 100 |
| Durability I | 102 | 100 |
| Durability II | 102 | 100 |
| Rolling resistance (RRC) | 102 | 100 |

Referring to Table 3, it was confirmed that the tire of Example 1 including the rubber reinforcing material according to the embodiment of the invention has a light weight, and yet has excellent high speed running performance, durability, and rolling resistance, compared to the tire of the reference Example.

The invention claimed is:

1. A rubber reinforcing material comprising:
   a fiber base;
   an adhesive layer placed on the fiber base; and
   a rubber compound layer placed on the adhesive layer,
   wherein the rubber compound layer has a thickness of 2 μm to 200 μm, a t50 value of 150 to 220 seconds, and a t90 value of 300 to 350 seconds
   (wherein, the t50 value is a time (seconds) required to reach 50% of the maximum crosslinking density of the rubber compound layer, measured by a rheometer according to the ASTM D2084 standard test method, and the t90 value is a time (seconds) required to reach 90% of the maximum crosslinking density),
   wherein the rubber compound layer comprises an elastic polymer, sulfur, a vulcanization accelerator, and a vulcanization retarder,
   wherein the elastic polymer comprises one or more rubbers selected from the group consisting of natural rubber, styrene-butadiene rubber, butadiene rubber, chloroprene rubber, isobutylene rubber, isoprene rubber, nitrile rubber, butyl rubber, and neoprene rubber, and
   wherein the rubber compound layer further comprises one or more additives selected from the group consisting of a peptizer, carbon black, a process oil, an activator, an antiaging agent, a petroleum resin, and an antioxidant.

2. The rubber reinforcing material according to claim 1, wherein the rubber compound layer has a thickness of 20 μm to 40 μm.

3. The rubber reinforcing material according to claim 1, wherein the rubber compound layer has intrinsic surface resistance of $4.0 \times 10^8$ ohm/sq to $8.0 \times 10^8$ ohm/sq.

4. The rubber reinforcing material according to claim 1, wherein the rubber compound layer has adhesive strength of 17.0 N/inch or more according to the ASTM D4393 standard test method.

5. The rubber reinforcing material according to claim 1, wherein the fiber base is a textile base.

6. The rubber reinforcing material according to claim 1, wherein the adhesive layer comprises resorcinol-formaldehyde-latex (RFL).

7. A tire comprising the rubber reinforcing material according to claim 1.

8. The tire according to claim 7, wherein the rubber reinforcing material is applied to at least one of a cap ply, a belt, and a carcass.

\* \* \* \* \*